Aug. 14, 1945. J. P. VOLLRATH 2,381,992
CONTROL SYSTEM
Filed Aug. 6, 1942 2 Sheets-Sheet 2

INVENTOR.
JOSEPH P. VOLLRATH
BY
C. B. Spangenburg
ATTORNEY

Patented Aug. 14, 1945

2,381,992

UNITED STATES PATENT OFFICE 2,381,992

CONTROL SYSTEM

Joseph P. Vollrath, Glenside, Pa., assignor to The Brown Instrument Company, Philadelphia, Pa., a corporation of Pennsylvania Application August 6, 1942, Serial No. 453,827

6 Claims. (Cl. 236—15)

The present invention relates to control systems, and more particularly to systems for controlling the supply of fuel to a kiln and therefore its temperature and the firing of the material passing through it.

An object of the present invention is to provide a system for automatically controlling the operation of the fuel supply to a rotary kiln in such a manner that the kiln will be maintained at constant temperature. It is a further object of the invention to stop the fuel feeding motor if the fuel supply should become exhausted for some reason or if the fuel should back up in the burner. It is a further object of the invention to delay the operation of the automatic fuel control system for a predetermined time after the kiln has been started in order that the system may become stabilized before the automatic control provisions begin to operate.

When a kiln is operating with a given load the fuel supply system is set to maintain it at a predetermined temperature. This setting is not usually disturbed when the kiln is stopped so that upon starting the kiln again it will be quickly brought up to a temperature dictated by the setting of the control system. Since, however, the kiln cooled down some while it was not operating, the control system would normally call for more fuel and the supply would be increased to such a point that the temperature will rise well above normal. To prevent such an occurrence, operation of the control system herein is delayed until a time has elapsed that would normally allow the kiln temperature to stabilize at a value for the particular fuel setting at the time. Thereafter the control system is set into operation to make the corrections necessary to bring the temperature of the kiln to a normal value, and keep it there.

The various features of novelty which characterize this invention are pointed out with particularity in the claims annexed to and forming a part of this specification. For a better understanding of the invention, however, its advantages and the specific objects obtained with its use, reference should be had to the accompanying drawings and descriptive matter in which is illustrated and described a preferred embodiment of the invention.

In the drawings,

Fig. 4 is a diagrammatic showing of a kiln operated switch.

Figure 1:
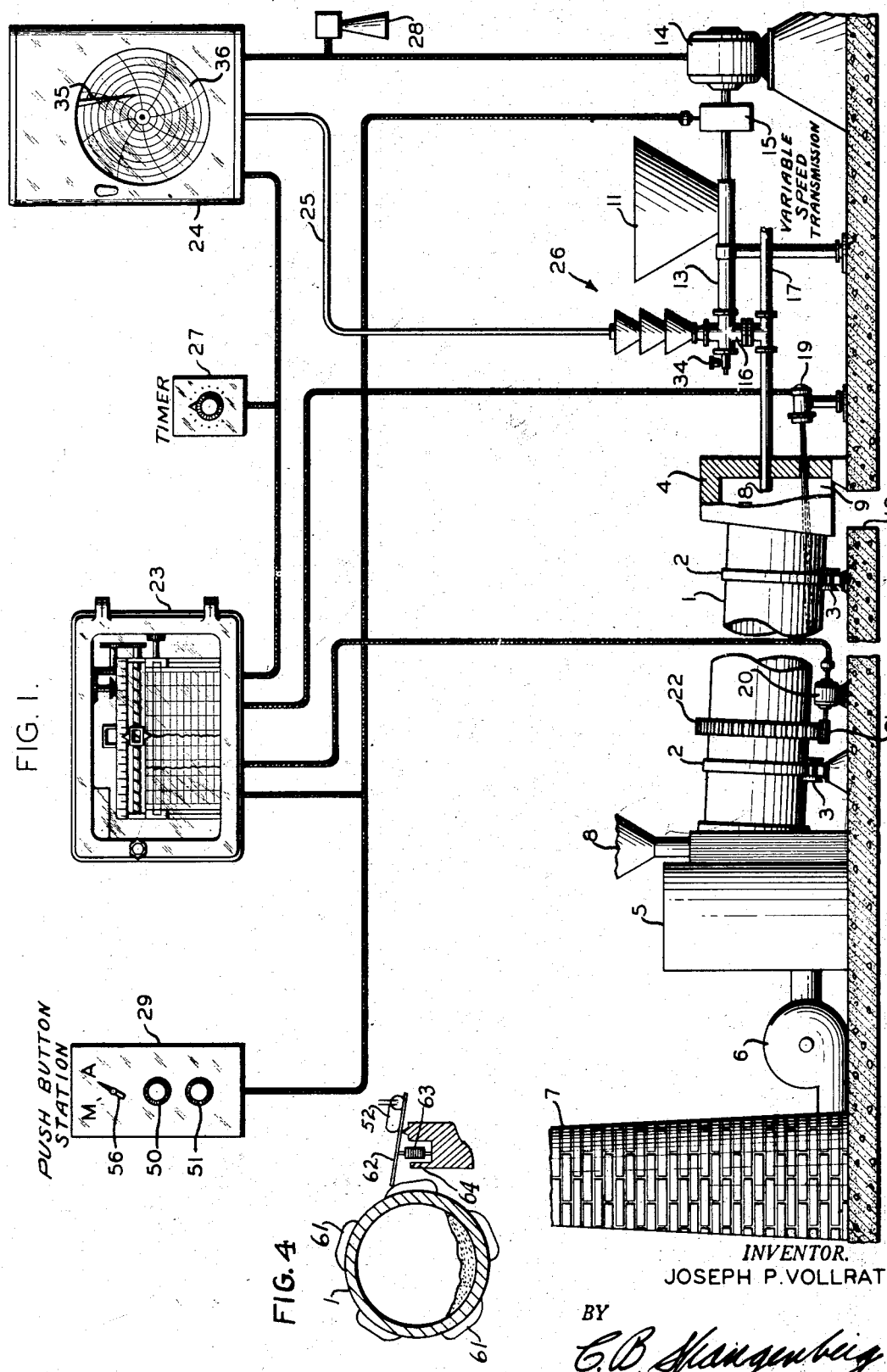
Figure 1 is a diagrammatic representation of the control system.

Referring first to Figure 1, there is shown at 1, a rotary kiln which is driven in any conventional manner to rotate it at a proper speed. This kiln is provided on its surface with tracks 2 that are received by rollers 3 to prevent the kiln from moving axially and at the same time to make bearings for it to rotate on. At the right end of the kiln, there is shown a firing head 4 through which fuel for the kiln is passed. At the left end of the kiln is a cover 5 in which the exhaust gases are received, and from which they are drawn by a fan 6 to a stack 7. Adjacent the upper or left end of the kiln is a material inlet 8 through which the material to be fired passes to the kiln. As the kiln rotates, the material will move through it and through the fire zone to an exit 9 in the firing head from which it will pass through an opening 10 in the floor to some suitable storing bin.

The kiln may be fired with any suitable fuel, but is shown herein as being supplied with powdered coal that passes from a pulverizer to the head 4. The pulverized coal is fed by a conventional screw feed 12 through the pipe 13 to a small vertical pipe 16. The pulverizer and the screw feed are driven through a variable speed transmission 15 by an electric motor 14. The coal passes through the vertical pipe 16 into a pipe 17 through which it is blown to the furnace. A supply of compressed air is forced through the pipe 17 to carry the coal to a burner 18 which is located in the head 4. This air also serves as secondary combustion air.

The temperature of the kiln is measured by a radiation pyrometer 19 which is sighted upon a portion of the inside wall of the kiln. The speed of the kiln is measured by a tachometer generator 20 that is driven by a pinion 21 on its shaft, and a gear 22 attached to the outer surface of the kiln 1. The speed and temperature of the kiln as measured by the generator and pyrometer are recorded by a recording potentiometer type controller 23. This instrument may be of the type shown in Harrison Patent 1,946,280, issued February 16, 1934, which serves to alternately make a record of several variable conditions that, in this case, may be the temperature and the speed of the kiln. This instrument also serves to operate control switches in a manner disclosed in the above mentioned patent to control the operation of the variable speed transmission 15 to thereby vary the supply of fuel to the kiln and its temperature. This instrument is also provided with a selector switch that automatically disconnects the control apparatus at times when the speed of the kiln is being measured and connects the control apparatus at times when the temperature of the kiln is being measured.

The coal feed motor 14 is controlled in response to an over supply or an under supply of coal fed from the pulverizer 11. To this end there is provided a pressure controller 24 which is responsive to the pressure in the coal line, and is connected thereto by means of a pressure line 25 and a filter 26. If for some reason, the coal has become jammed in the pulverizer, and is not going properly to the furnace, the pressure in the pipe 16, above which the filter is located, will drop due to the action of the injection air in pipe 17. If, however, the burner 18 should become clogged, coal would continue to be fed through the pipe 16 and the pressure would rise. This control instrument may be a controller such as is disclosed in Side Patent 1,969,158, issued August 7, 1934, which patent discloses the controlling of switches in response to the increase and/or decrease of a measured pressure. In addition to controlling the motor, an alarm 28 may be connected in the circuit so that an attendant will be notified when the coal feed motor is not operating properly.

Figure 2:
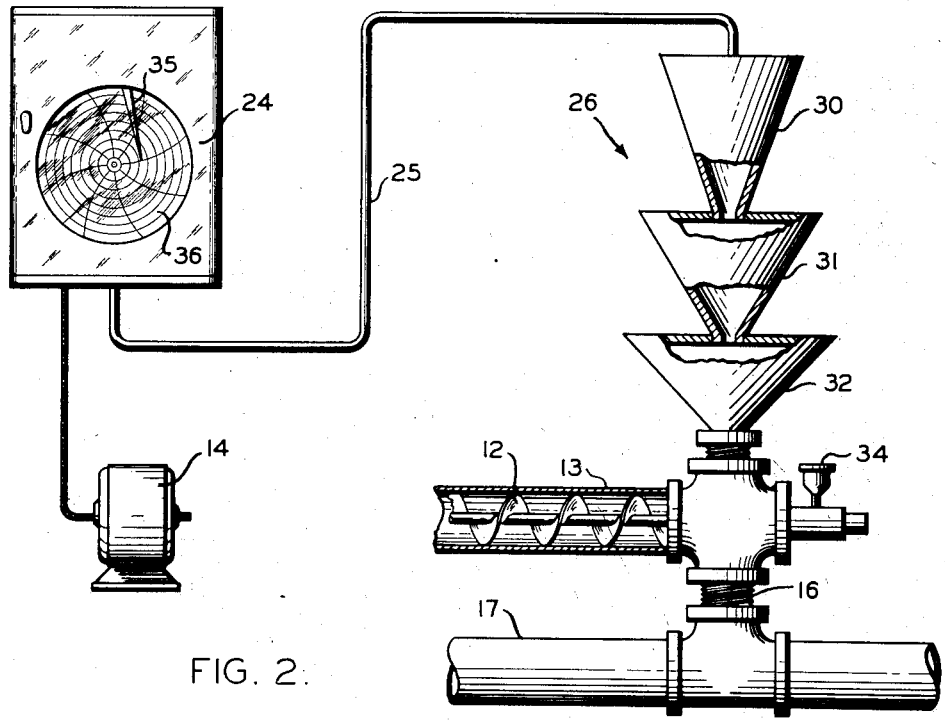
Figure 2 is an enlarged view of the pressure control portion of the control system.

The filter, as is shown best in Figure 2, consists of a plurality of conical shaped expansion chambers 30 and 31 and 32 which are placed one above the other, and are connected by means of small openings 33. The size of these chambers taken in connection with the small opening between them serve to stop any coal dust that might otherwise clog the line 25 and render the controller 24 inoperative. There is also shown in this figure a grease cup 34 which serves to lubricate the bearing at the end of the screw feed. It is noted that the controller 24 is provided with a pen 35 that will make a record of the pressure and, therefore, the operation of the coal feed motor, on a chart 36. The controller 24, as above noted, serves to stop the motor 14 when the pressure in the coal feed line reaches a predetermined maximum or minimum value, and serves to operate the signal 28 whenever the motor stops. This controller also operates a switch which controls the starting and stopping of a timer 27 that serves a purpose to be later described.

Figure 3:
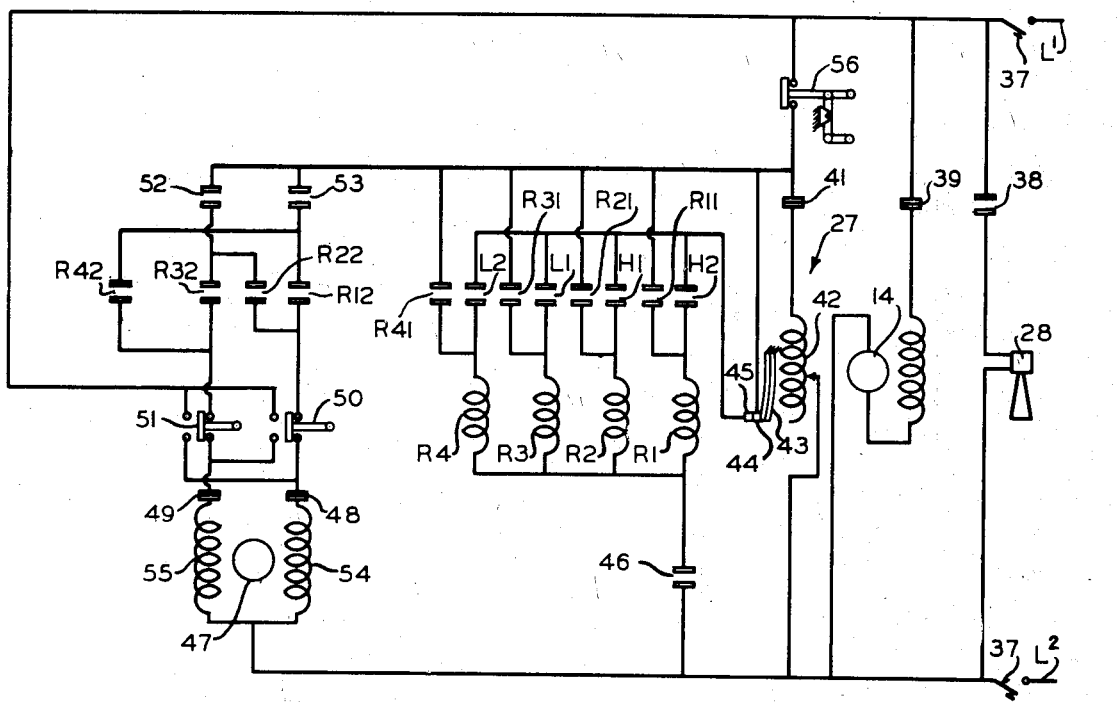
Figure 3 is a schematic wiring diagram of the control system.

Referring next to the wiring diagram of Figure 3, it will be seen that current is supplied to the control system through lines L1 and L2 that are provided with a main line switch 37. The signal 28 is connected across the lines in circuit with a switch 38. The motor 14 is connected across the line in series with a switch 39, and the timer 27 is connected across the line in series with the switch 41. The switches 38, 39 and 41 are the switches operated by the controller 24.

The timer may be of any conventional type but is shown here as consisting of a coil 42 which serves to heat a bimetallic strip 43 that, when heated, will warp to the left to bring contact 44 into engagement with contact 45. The speed with which the contacts close after current is supplied to the coil 43 will depend upon the amount of heating resistance in the coil. This may be adjustable to vary the timing of the switch.

The timer switch controls the supply current to the control switches which operate the variable speed mechanism. The primary switches of the control system consist of switches H1 and H2 and L1 and L2 that are operated by the potentiometer instrument 23. The arrangement is such that when the temperature deviates a slight amount from some normal value, switches H1 or L1 will be closed depending upon whether the temperature is high or low. When the temperature deviates a large amount from the normal value, switch H2 or L2 will be closed. These switches control the energization of the coils of relays R1, R2, R3, and R4. Each of the relays controls two switches. When the switch H2 is closed in the instrument, coil R1 will be energized to close switch R11 and form a holding circuit for the coil and to close switch R12. When switch H1 is closed, coil R2 will be energized to close switches R21 and R22. When switch L1 is closed, relay R3 will be energized to close switches R31 and R32 and when switch L2 is closed, relay R4 will be energized to close switches R41 and R42. Even though the potentiometer switches may be closed, the relays cannot be energized unless a selector switch 46 is also closed. This latter switch is located in the controller 23 and is closed when the temperature of the kiln is being measured, but is opened when the speed of the kiln is being measured.

The variable speed mechanism 15 has its speed adjusted by a reversible electric motor 47, the fields of which can be energized in several ways. Field 54 of the motor 47 is connected at one side directly to the line and at the other side through limit switch 48, manual switch 50 and either switch R12 and interrupter switch 53, or switch R22 and interrupter switch 52. The field 55 is connected across the line through limit switch 49, manual switch 51 and either switch R32 and interrupter 52 or switch R42 and interrupter 53. The interrupter 52 is a switch which is opened and closed in synchronism with the speed of the kiln and is preferably driven in some manner from the kiln, as is shown diagrammatically in Figure 4. In that figure there are shown a plurality of projections 61 extending from the surface of the kiln that are adapted to engage one end of a pivoted support 62 for the switch 52. The projections move the support around its pivot against the bias of a spring 63 to close the switch. A suitable stop 64 determines the normal position of the support 62, in which the switch 52 is open. The switch 53 is an interrupter switch which is opened and closed at periodic intervals which are generally longer than the intervals that switch 52 is closed and may be of the type shown in Moore Patent 2,235,560, granted March 18, 1944. It will be seen that if the temperature has deviated only a slight amount from normal, switch R22 or R32 will be closed to energize one of the fields of the motor for periods of time depending upon the operation of the interrupter switch 52. If, however, the temperature has deviated a large amount from normal either switch R12 or R42 will be closed to energize the motor for periods of time depending upon the operation of switch 53. In any event, the motor may be operated in either direction by the closure of manual switches 50 and 51. In the motor control circuit, there is also provided a switch 56. This switch when it is in the position shown permits automatic control of the motor 47 through the control circuit just described. When a switch 56 is opened by pressing the upper button, the automatic control system will be disconnected and the motor 47 can only be operated upon the depression of switches 50 and 51.

While the operation of the system should be obvious from the above description, a short summary will now be given. Assuming that the kiln is operating in a normal fashion, the motor 47 will be driven in one direction or the other for periods of time depending upon the deviation of the temperature from normal at such times that the switch 46 is closed indicating that the temperature of the kiln is being measured. If the temperature of the kiln is high, either relay R1 or R2 will be closed so that the motor 54 will be driven for periods of time depending upon the amount of deviation to slow down the supply of fuel. If the temperature of the kiln is low, either relay R3 or R4 will be closed to energize the field 55 for periods of time depending upon the amount of deviation to speed up the supply of fuel.

If during the operation of the system, the supply of coal should either run out or the burner 18 should become clogged, the controller 24 will operate to open switch 39 to stop the motor 14 and close switch 38 to start the alarm operating. The controller 24 will also open switch 41 to de-energize the timer coil 42 and permit contacts 44 and 45 to be separated to prevent any subsequent operation of the speed changing motor 47. When the cause for the disturbance to the supply of fuel has been located, and corrected, the motor 14 may again be started. The controller 24 at this time closes the switch 41, and a predetermined time later, the coil 42 will be heated sufficiently to cause contact 44 to engage contact 45. At this time, the control system will again operate. The purpose of the delay in operation of the control system after the supply of fuel has been started is to permit the kiln to be fired for a long enough period of time so that its temperature may stabilize before the fuel supply is changed. The fuel supply, at this time will probably be very close to that necessary, since the speed change mechanism has the same setting that it had when the system was stopped.

From the above, it will be seen that I have provided a control system for rotary kiln which will adjust the fuel supply in accordance with deviations of the temperature from a normal value and will make a record of the speed of the kiln. It will also be seen that the control system is provided with a means to delay its operation until a predetermined time after the system has been started up, so that the control system can be quickly stabilized. The system also provides the means responsive to the supply of fuel to control the entire operation of the control system.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a kiln control system, the combination of means to supply fuel to said kiln, means responsive to a condition of the supply of fuel to the kiln to stop and start said fuel supply means as said condition varies from a normal value, means to measure the temperature of the kiln, mechanism operated by said measuring means to vary the speed of said fuel supply means in accordance with the temperature of the kiln, and means to delay the operation of said mechanism for a predetermined period of time after the fuel supplying means has started whereby kiln conditions may become substantially stabilized before the fuel supply is varied.

2. In a kiln control system, the combination of means to supply fuel to a kiln, drive means for said supply means, a means to adjust said supply interposed between said drive means and said supply means, means to measure the temperature of said kiln, mechanism operated by said measuring means to regulate said adjusting means in response to temperature variations of the kiln to maintain the temperature of the kiln substantially constant, means responsive to the supply of fuel to stop said drive means when the fuel pressure falls below or increases above predetermined limits, and timing means to delay operation of said mechanism for a predetermined period of time after said drive means has started whereby kiln conditions may become substantially stabilized before the fuel supply is varied.

3. In a kiln control system, the combination of means to measure the temperature of the kiln, variable speed means to supply fuel to said kiln, means operated by said measuring means to speed up said variable speed means in response to a reduction in temperature of the kiln and to slow down said variable speed means in response to an increase in temperature of the kiln, and means operative to delay operation of said means operated by said measuring means for a predetermined period of time each time said variable speed means is started whereby kiln conditions may become substantially stabilized before the fuel supply is varied.

4. In a rotary kiln control system, the combination of means to measure the temperature of a kiln, variable speed means to supply fuel to said kiln, a first interrupter driven at a speed proportional to the speed of rotation of the kiln, a second interrupter driven at a constant speed with a period of operation longer than that of said first interrupter, means operated by said measuring means to adjust said variable speed means for periods of time limited by said first interruptor if the temperature is a relatively small amount from normal and to adjust said variable speed means for periods of time limited by said second interruptor if the temperature of the kiln is a relatively large amount from normal, and means to delay the operation of said variable speed means a predetermined period of time each time the control system is started after a shut down whereby kiln conditions may become substantially stabilized before the fuel supply is varied.

5. In a kiln control system, the combination of means to measure the temperature of a kiln, means to supply fuel to said kiln, drive means for said supply means, means operated by said measuring means to adjust said drive means and vary the supply of fuel in accordance with the temperature of the kiln, means responsive to the pressure of the fuel supplied to the kiln to stop and start the drive means, and mechanism operated by said responsive means to delay the operation of adjusting said drive means for a predetermined time after said drive means has started up whereby kiln conditions may become substantially stabilized before the fuel supply is varied.

6. In a kiln control system, the combination of means to supply fuel to the kiln, means to drive said supply means, variable speed mechanism interposed between said drive means and said supply means, means responsive to the pressure of the fuel in the supply means to control the operation of the drive means, means responsive to the temperature of the kiln to control the operation of said variable speed mechanism, and means operated by said means responsive to the pressure of the fuel to delay the starting of said variable speed mechanism until a predetermined time after said drive means has started whereby kiln conditions may become substantially stabilized before the fuel supply is varied.

JOSEPH P. VOLLRATH.